(12) United States Patent
Ono

(10) Patent No.: US 7,907,295 B2
(45) Date of Patent: Mar. 15, 2011

(54) IMAGE PROCESSING APPARATUS, CONTROL METHOD THEREOF AND CONTROL PROGRAM THEREOF

(75) Inventor: Takashi Ono, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 10/522,314

(22) PCT Filed: Jul. 25, 2003

(86) PCT No.: PCT/JP03/09432
§ 371 (c)(1),
(2), (4) Date: Jan. 25, 2005

(87) PCT Pub. No.: WO2004/012439
PCT Pub. Date: Feb. 5, 2004

(65) Prior Publication Data
US 2005/0225794 A1    Oct. 13, 2005

(30) Foreign Application Priority Data

Jul. 25, 2002    (JP) ................................ 2002-215965

(51) Int. Cl.
*G06F 3/12*    (2006.01)
*G06F 15/173*    (2006.01)
*G06K 15/00*    (2006.01)
*H04L 12/28*    (2006.01)
*H04Q 11/00*    (2006.01)

(52) U.S. Cl. ...... 358/1.15; 358/1.16; 370/351; 370/360; 370/370; 370/395.52; 370/401; 709/238; 395/200.55; 395/200.56

(58) Field of Classification Search ................ 358/1.15, 358/1.16; 709/238; 370/351, 360, 370, 395.52, 370/401; 395/200.55, 200.56
See application file for complete search history.

(56) References Cited

U.S. PATENT DOCUMENTS 4,641,133 A * 2/1987 Ono .............................. 340/540
(Continued)

FOREIGN PATENT DOCUMENTS

JP    10-8447    3/1998
(Continued)

OTHER PUBLICATIONS

Thomson et al., "Request for Comments 2462 IPv6 Stateless Autoconfiguration", The Internet Engineering Task Force (IETF) (online), Dec. 1998.

*Primary Examiner* — Edward L Coles
*Assistant Examiner* — Hilina S Kassa
(74) *Attorney, Agent, or Firm* — Fitzpatrick, Cella, Harper & Scinto

(57) ABSTRACT

Disclosed is technology capable of improving operability of a multi-function image processing apparatus with simple inexpensive structure and easily designing necessary system software. After start-up, the apparatus is connected to an IPv6 router on a network, prefix information is acquired from the router, there is generated an IP address unique to each of image processing functions such as printing, scanning and FAXing on basis of the acquired prefix information, the apparatus communicates with other appliance on the network by use of the IP address generated for every image processing function, and each image processing function operates correspondingly to a result of the communication. Transfer task transfers data to be inputted and outputted among print task, scan task and facsimile task by use of IP addresses each different for every function, and the respective tasks run on a time-division basis using a task switchover by OS.

8 Claims, 9 Drawing Sheets

U.S. PATENT DOCUMENTS

| | | | | |
|---|---|---|---|---|
| 4,719,514 | A * | 1/1988 | Kurahayashi et al. | 358/426.05 |
| 4,897,831 | A * | 1/1990 | Negi et al. | 370/249 |
| 5,075,783 | A * | 12/1991 | Yoshida et al. | 358/439 |
| 5,216,705 | A * | 6/1993 | Yoshida et al. | 379/100.14 |
| 5,394,406 | A * | 2/1995 | Ono et al. | 714/748 |
| 5,987,494 | A * | 11/1999 | Ouchi | 718/107 |
| 6,247,057 | B1 * | 6/2001 | Barrera, III | 709/229 |
| 6,288,790 | B1 * | 9/2001 | Yellepeddy et al. | 358/1.15 |
| 6,934,932 | B2 * | 8/2005 | Dathathraya | 717/115 |
| 7,031,276 | B2 * | 4/2006 | Inoue | 370/328 |
| 7,155,500 | B2 * | 12/2006 | Nikander | 709/223 |
| 7,185,074 | B2 * | 2/2007 | Schacht et al. | 709/221 |
| 7,257,104 | B2 * | 8/2007 | Shitama | 370/338 |
| 7,264,411 | B2 * | 9/2007 | Matsunaga et al. | 400/62 |
| 7,266,601 | B2 * | 9/2007 | Maekawa et al. | 709/224 |
| 7,308,495 | B2 * | 12/2007 | Ishiyama et al. | 709/223 |
| 2001/0009424 | A1 | 7/2001 | Sekiguchi | 345/740 |
| 2003/0101236 | A1 * | 5/2003 | Ohara | 709/218 |
| 2003/0105841 | A1 * | 6/2003 | Miyake et al. | 709/220 |
| 2003/0142683 | A1 * | 7/2003 | Lam et al. | 370/401 |
| 2003/0220900 | A1 * | 11/2003 | Gabor | 707/1 |

FOREIGN PATENT DOCUMENTS

WO     WO 00-50969 A     8/2000

* cited by examiner

IMAGE PROCESSING APPARATUS, CONTROL METHOD THEREOF AND CONTROL PROGRAM THEREOF

CROSS REFERENCE TO RELATED APPLICATION

This Application is a National Stage filing under 35 U.S.C. §371 of International Application No. PCT/JP2003/009432, filed Jul. 25, 2003, which in turn claims the benefit of priority based on Japanese Application No. 2002-215965 (Pat.) filed on Jul. 25, 2002. International Application No. PCT/JP2003/009432 has been published in English as International Publication No. WO 2004/012439 A1.

TECHNICAL FIELD

The present invention relates to an image processing apparatus having a plurality of image processing functions.

BACKGROUND ART

There have hitherto been known various types of information processing apparatuses such as a PC (personal computer), a printer, a scanner, etc. which are used by establishing connections to a network (WAN (Wide Area Network) such as the Internet, and LAN).

IP (Internet Protocol) is a protocol widely utilized among appliances connected to the network. According to the IP system, the individual appliances identify with each other on an IP address basis in a way that assigns a unique IP address to each of the appliances.

As for an address by which a terminal apparatus can be distinguished from any other terminal on the network, a conventional IP protocol (IPv4 (Internet Protocol version 4)) assigns one address to one network interface.

On the other hand, IPv6 (Internet Protocol version 6), which has been on a wide spread over the recent years, defines a technology by which the terminal, when connected to a router, performs communications with the router and automatically acquires an IP address. In this case also, the system operates to acquire one IP address for one network interface.

Therefore, in the case of even a multi-function terminal, for example, a multi-function image processing apparatus that synthesizes a plurality of functions as a scanner, a printer and a facsimile, according to the conventional system described above, there was one address by which a terminal apparatus can be distinguished from any other terminal on the network.

According to the conventional system, there was one IP address that can be assigned to an appliance having only one network interface in many cases. Therefore, even the multi-function terminal having the plurality of functions as, e.g., the scanner, the printer and the facsimile, is identified as just a certain single terminal by any other appliance on the network. Further, this appliance must provide all services by use of this IP address.

Accordingly, a driver software for activating the multi-function terminal such as the multi-function image processing apparatus needs complicated processes including arbitration between the respective functions as well as performance of the respective functions, and therefore a problem is that a design of the driver software requires a great number of steps because of being the multi-functions.

Moreover, the PC on the side of utilizing the multi-function terminal such as the multi-function image processing apparatus, must be installed with the driver software that is large in program capacity and complicated in operation, which causes a large load. For instance, even in a case where the multi-function terminal is utilized as only the printer, the PC must be installed with the multi-function driver software including the functions as the scanner and the PC-FAX, so that the PC has to be installed with the driver software having a heavy load. Further, as viewed from a PC's user, the user has to select at least the functions (of reading an image, printing and transmitting by FAX) executed by the multi-function image processing apparatus after booting the driver software of the multi-function image processing apparatus itself, and hence there arises such a problem that the operation becomes complicated.

According also to the-one-address-to-one-network-interface system in the prior art, it is not impossible to assign IP addresses to the respective functions as the scanner, the printer and the facsimile of the multi-function terminal, however, a network interface such as an Ethernet (trade name) card must be provided for every function, and therefore a problem is that its architecture becomes complicated and costly.

DISCLOSURE OF THE INVENTION

An object of the present invention is to obviate the problems given above, to improve an operability of a multi-function image processing apparatus with a simple and inexpensive architecture by utilizing an IPv6 technology and to easily design necessary system software.

IP addresses are assigned to respective image processing functions, whereby the image processing apparatus having these functions appears from a PC so that its appliances of these functions are independently connected to the LAN. It is therefore possible to independently design driver software for every function, which is installed into the PC, and this scheme has an effect of enabling a decrease in the number of steps of designing the driver software. Further, an architecture of the driver software can be simplified, and hence it is feasible to design the driver software that is light in load on the PC. Moreover, as the driver software is created for every function, it is enough for the user to boot a necessary piece of driver software when required, and the operability from the PC side is improved. Further, only the required driver software can also be installed.

BEST MODE FOR CARRYING OUT THE INVENTION

Embodiments of the present invention will hereinafter be described with reference to the accompanying drawings.

Figure 1:
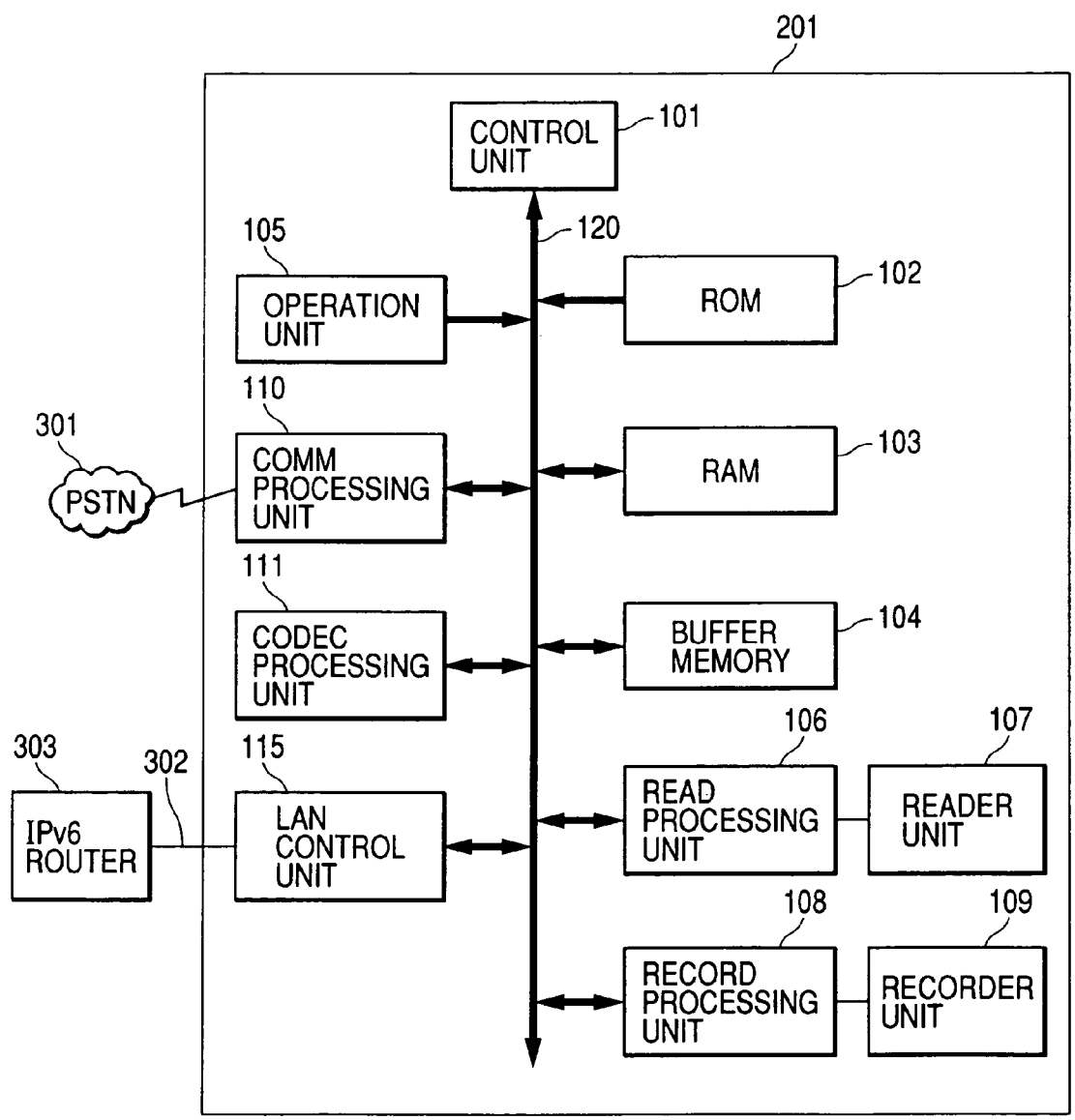
FIG. 1 is a block diagram showing a structure of a multi-function image processing apparatus as a terminal apparatus that adopts the present invention.

FIG. 1 shows a structure of an image processing apparatus (multi-function image processing apparatus) 201 combining a plurality of functions as a scanner, a printer and a facsimile by way of a terminal apparatus in which the present invention is embodied.

Referring to FIG. 1, a control unit 101 defined as a system control unit controls the whole of the terminal apparatus constructed of respective block components illustrated therein.

A ROM 102 is stored with control programs of the control unit 101, an operating system (OS) program, etc. The control unit 101 controls an operation of the terminal apparatus in accordance with the control programs stored on the ROM 102.

According to the present invention, the respective control program stored on the ROM 102 undergoes software control such as scheduling, a task switchover, etc. under the control of the OS program (stored on the ROM 102 or other storage medium).

A RAM 103 is used for arithmetic processing and for storing set values registered by an operator, control data of the apparatus, etc., and further for storing an IP address acquired when the terminal apparatus is connected to an IPv6 router.

Figure 3:
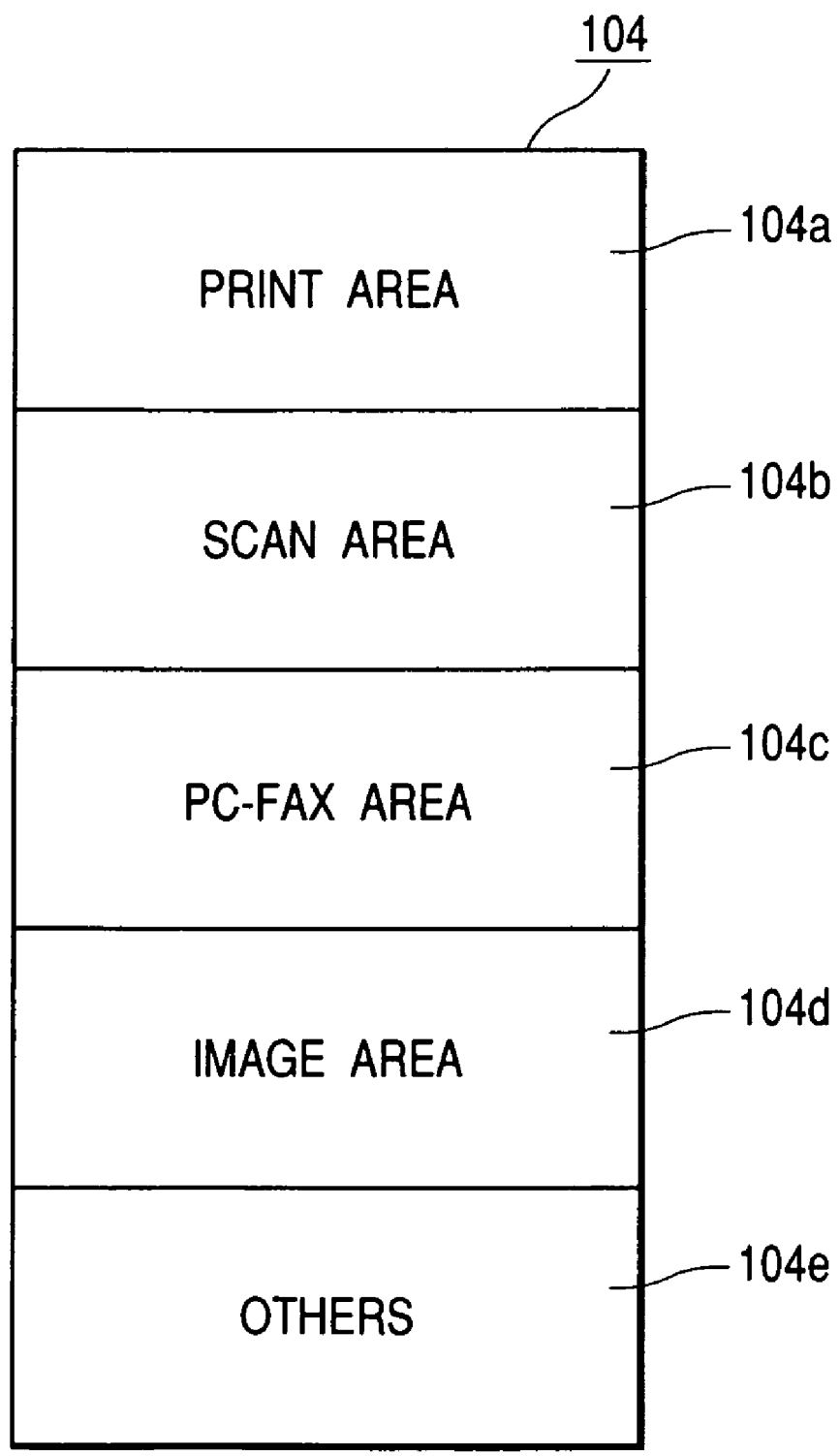
FIG. 3 is an explanatory diagram showing a structure of a buffer memory of the apparatus in FIG. 1.

A buffer memory 104 is used for accumulating readout image data and received image data, and for accumulating data packets transmitted and received via a LAN. The buffer memory 104 has its area that is, as illustrated in FIG. 3, segmented into a printer area 104a, a scanner area 104b, a PC-FAX area 104c, an image area 104d and so on. A control task of each function performs transferring and receiving the data packet in a buffer area for each task on the thus-segmented buffer memory 104.

An operation unit 105 comprising a variety of input keys, an LED (Light Emitting Diode), an LCD (Liquid Crystal Display), etc. is used for the operator to execute various input operations and display operation states of the image processing apparatus, and so on.

A read processing unit 106 effects various image processing such as binarizing processing, half-tone processing, etc. on image signals obtained by optically reading an original and converted into electrical image data by a photoelectric converting device, thereby outputting hyperfine image data.

The read processing unit 106 is controlled by a scan control task program of the control program stored on the ROM 102. The reader unit 107 is constructed of photoelectric converting devices such as a CCD, a contact image sensor and so forth.

A record processing unit 108 executes resolution convert processing and smoothing processing on the record image data in order to record the image data by a recorder unit 109. Further, if a fault such as no-paper, a paper jam, an exhaustion of toner (or ink), etc. occurs in the recorder unit 109, the record processing unit 108 receives fault information from the recorder unit 109 and notifies the control unit 101 of this fault.

The record processing unit 108 is controlled by a printer control task program of the control program stored on the ROM 102. Further, the recorder unit 109 is constructed of a laser beam printer, an inkjet printer, etc. and includes a recording sheet detection means, a toner (or ink) detection means and a jam detection means.

A communication processing unit 110 is constructed of a MODEM (modulator/demodulator), an NCU (Network Control Unit) and so on. The communication processing unit 110, which is connected to a communication line 301 such as PSTN (Public Switched Telephone Network), etc., performs communication control based on T.30 Protocol pursuant to ITU-T (International Telecommunication Union-Telecommunication Sector) Recommendations and line control of originating and receiving a call via the communication line. The communication processing unit 110 is controlled by a communication control task program of the control program stored on the ROM 102.

A CODEC processing unit 111 executes coding/decoding processing for compressing and expanding the image data, and supports a coding/decoding system such as MH (Modified Huffman), MR (Modified READ (Relative Element Address Designate), etc. as utilized mainly for facsimile communications, or supports, depending on specifications of the device, a coding/decoding system such as JPEG (Joint Photographic Experts Group), MPEG (Moving Picture Experts Group), etc.

A LAN control unit 115 performs control for communicating with other appliances via the LAN. The LAN control unit 115 is constructed of NIC (Network Interface Card) such as Ethernet (trade name) card and of a control circuit of NIC (a control means of NIC may also be constructed by software of the control unit 101).

The use of the LAN control unit 115 enables protocol control to be done based on a protocol such as TCP/IP (Transmission Control Protocol/Internet Protocol) on a physical network such as Ethernet (trade name). For example, it is possible to receive the data packet having an IP address acquired for each of the functions of the terminal apparatus and to transmit the data packet from the terminal apparatus at a speed of, for example, 10 Base/T. The LAN control unit 15, upon receiving the data packet, notifies the control unit 101 of this receipt.

The LAN control unit 115 is connected through a LAN cable 302 to an IPv6-supported router 303.

Note that the numeral 120 in FIG. 1 represents a system bus for connecting the respective block components to the control unit 101.

The apparatus in FIG. 1 is capable of functioning as a printer, a scanner, and a PC-FAX in accordance with commands issued from a PC (Personal Computer) connected to the LAN. Each of operations will hereinafter be explained in detail.

To start with, an auto address acquiring scheme (operation) standardized in IPv6 will be discussed as a premise of the present invention.

According to IPv6, when the terminal apparatus (designated by 201 in FIG. 1) is connected to the IPv6 router (303 in FIG. 1), the terminal apparatus requests the router to send a 64-bit numerical value (known as a prefix) that is allocated and unique to this router. The terminal apparatus, when this prefix is sent thereto, generates a 64-bit numerical value called an interface ID by itself and combines this interface ID with the prefix sent from the router, thereby completely composing (structuring) an IP address having totally 128 bits. Next, the terminal apparatus sends the thus structured IP address onto the LAN and checks whether or not there is any other terminal using the same IP address. If not duplicated, this address is determined as the IP address of that terminal apparatus. If duplicated, the confirmation as to the address duplication is again made after the numerical value of the interface ID is changed. If there is no duplication, the changed address is determined as the IP address. This is what is called the IPv6-based auto address acquiring scheme.

Herein, the aforementioned address acquisition sequence in the terminal apparatus of the present invention will be described with reference to a flowchart in FIG. 4. Note that control procedures in flowcharts from FIG. 4 onwards are to be executed by the control unit 101.

Figure 4:
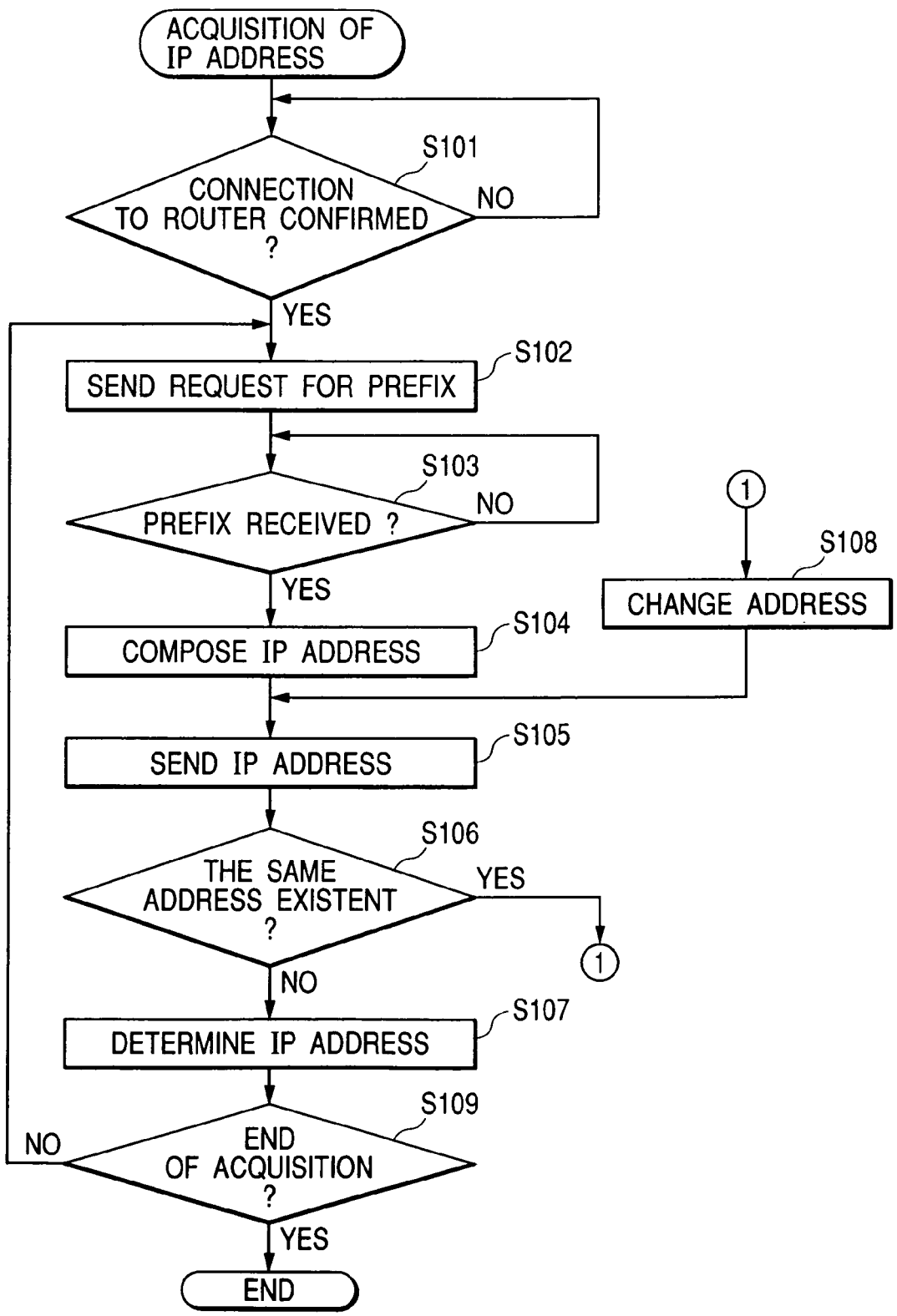
FIG. 4 is a flowchart showing IP address acquisition processing in the apparatus in FIG. 1.

When it is confirmed that the terminal apparatus (201 in FIG. 1) is connected to the IPv6 router (303 in FIG. 1) in step S101 in FIG. 4, the following control is carried out.

To begin with, in step S102, the control unit 101 sends to the router a command requesting the prefix of the router from the LAN control unit.

The control unit 101, upon receiving the prefix from the router in step S103, generates an IP address by adding an interface ID of predetermined 64-bit numerical value to the received prefix in step S104.

After generating the IP address, in step S105, the control unit 101 sends the generated address to the network and checks whether there exists any other terminal having the same address under this router.

If the address duplication is not confirmed in step S106, the control unit 101 advances to step S107, wherein the address is determined as the IP address of this terminal. The control unit 101, upon determining the first IP address, recognizes this address as the IP address for the printer.

After determining the first IP address, the control unit 101 makes a loopback to step S102. Then, the control unit 101 repeats the same address acquiring operation by sending the prefix request command again to the router via the LAN control unit. In step S104, the control unit 101, when the prefix is sent from the router, generates an address by adding, to the prefix, a numerical value into which "1" is added (plus 1) to the previous numerical value added to the prefix last time, i.e., generates a new address different from the address acquired last time. In step S105, the control unit 101 transmits this new address onto the LAN.

Then, the duplication of the IP address is checked in step S106 in the same way as it has been done last time, and, if not duplicated, the address is determined as a second IP address. When the second IP address is determined, the control unit 101 recognizes this address as the IP address for the scanner.

As the second address has been thus determined, the control unit 101 make likewise the loopback again to step S102, wherein the control unit 101 repeats the address acquiring operation by sending the prefix request command again to the router via the LAN control unit.

Then, in step S104, the control unit 101, when the prefix is sent from the router, generates a new address by adding to the prefix a numerical value into which that "1" is added (plus 1) to the previous numerical value added to the prefix last time and transmits this new address onto the LAN in step S105. Then, the duplication of the IP address is checked in step S106 in the same way as it has been done last time, and, if not duplicated, the address is determined as a third IP address. When the third IP address is determined, the control unit 101 recognizes this address as the IP address for the PC-FAX.

As discussed above, according to this embodiment, the plurality of IP addresses are acquired under the Plug and Play control through the router. The assumption in this embodiment is that the terminal apparatus in FIG. 1 has the three functions as the printer, the scanner and the PC-FAX and therefore the three IP addresses are to be acquired. It is judged in step S109 whether these three IP addresses are acquired or not. After acquiring the three IP addresses, the IP address acquisition processing in FIG. 4 is terminated.

Note that the terminal apparatus in FIG. 1 has the three functions as the printer, the scanner and the PC-FAX and, and hence the three IP addresses are acquired in FIG. 4. In a terminal apparatus having a plurality of functions to be activated by the PC the address acquiring operation may be repeated by the number of these functions.

Referring again to FIG. 4, during the address acquiring operation, if the address is duplicated, the processing proceeds to step S108, wherein the numerical value to be added to the prefix is incremented one by one, thus searching for an address with no duplication by repeating the address acquiring operation.

Note that the interface ID's 64-bit numerical value numerical added to the prefix may be generated based on a MAC (Media Access Control) address assigned to the terminal apparatus. In this case, IPv6 defines a method of inserting a fixed value such as [fffe] (hexadecimal number) into, as shown in FIG. 9, a middle field of a 48-bit MAC address.

Figure 9:
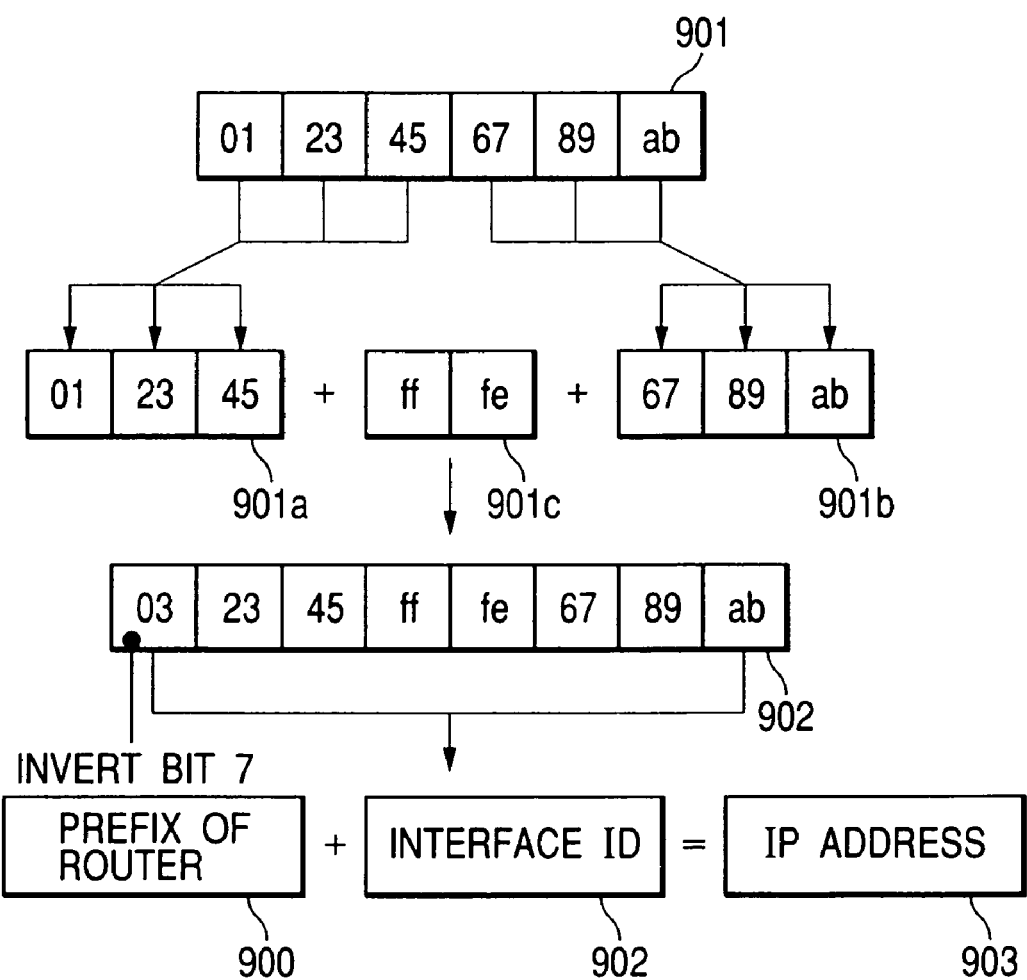
FIG. 9 is an explanatory diagram showing a method of generating an interface ID according to IPv6.

Referring to FIG. 9 (every address value is expressed in the hexadecimal number), a 48-bit MAC address 901 is divided in half into two pieces of blocks 901a and 901b each having 24 bits (wherein a seventh bit of the high-order block 901a is inverted, thereby converting into [03] from [01]), and a block 901c of [fffe] (hexadecimal number) is inserted into the middle field of the MAC address, thus generating an interface ID 902. A final IP address 903 can be generated from the above interface ID 902 and a prefix 900 acquired from the router as described above.

Through the processing in FIG. 4, the necessary number of IP addresses corresponding to the number of the functions of the apparatus are acquired, and it is thus possible to acquire the IP addresses for the respective functions of the terminal apparatus. As described above, the IP addresses are acquired for the respective functions, whereby though the single terminal apparatus is physically connected to the network, it seems to other devices such as the PCs on the LAN that the printer, the scanner and the PC-FAX are individually connected to the LAN, respectively.

Next, an operation based on a command issued from the PC (or other device on the LAN) will be explained.

Figure 2:
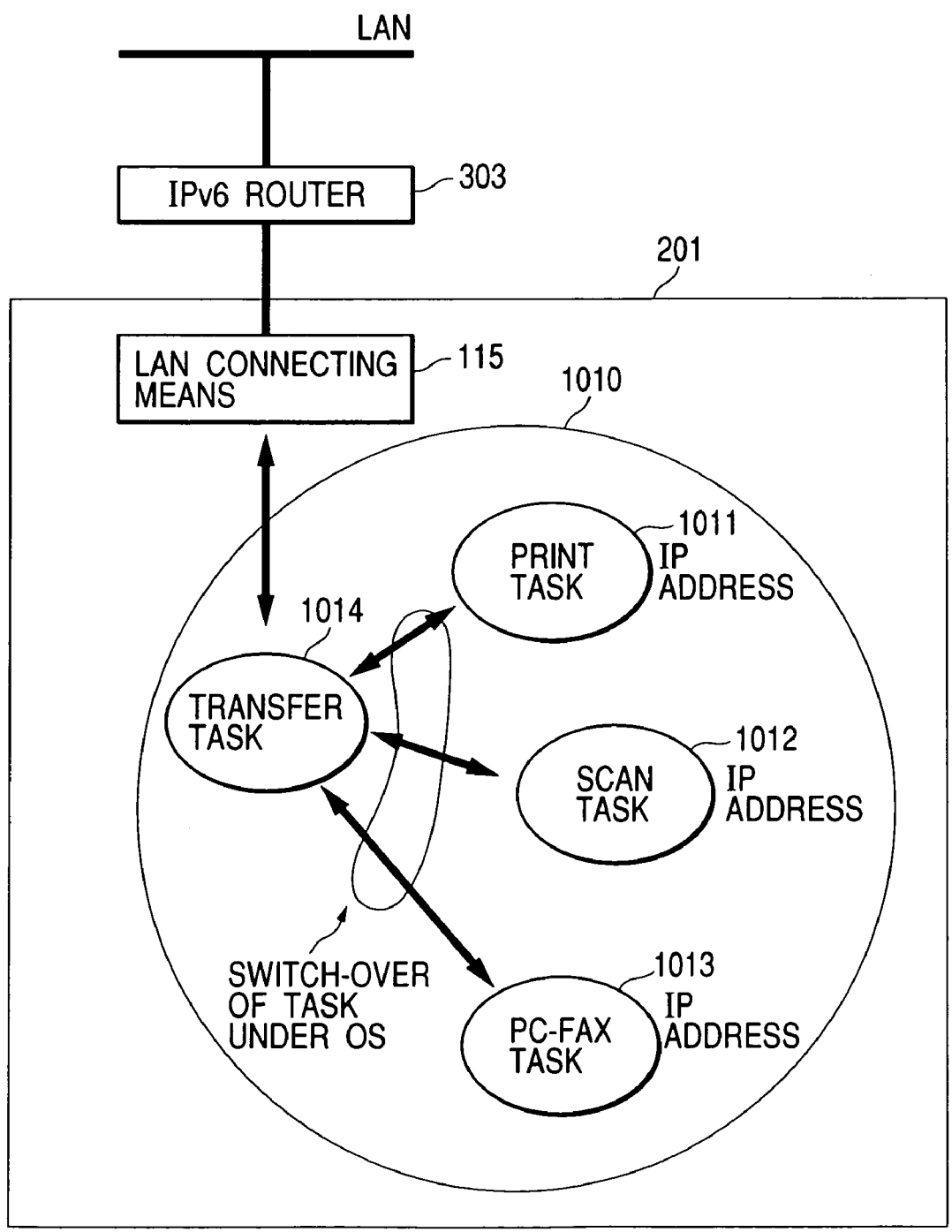
FIG. 2 is an explanatory diagram showing a structure of control tasks of the apparatus in FIG. 2

FIG. 2 is a conceptual diagram showing a structure of the control program of the terminal apparatus of the present invention and a flow of the data packet. As shown in FIG. 2, the control program of the terminal apparatus of the present invention is executed by the control unit 101 and is composed of control tasks 1011, 1012, 1013 for controlling the respective printing, scanning and PC-FAXing operations, a transfer task 1014 for controlling the transfer/receipt of the data packet to and from LAN, and a main task 1010 for entirely managing these control tasks. The respective control tasks are under the management by the OS (Operating System) and subjected to time division processing by an optimum switchover of the tasks. The data packets are transferred and received through the transfer task 1014 between the LAN connecting means 115 and each active task.

Among the tasks given above, the transfer task 1014 is defined as a task program for controlling the transfer/receipt of the data packets between each active control task and the PC. The transfer task 1014 is started up (booted) just when the LAN control unit receives the data packet from the PC, confirms a destination IP address of this data packet, and stores the data packet in a buffer area (104a, 104b, . . . in FIG. 3) of the control task designated by the IP address.

Further, when the task is booted upon the OS task switchover, if there is a transmission packet after searching through the buffer areas of the control tasks 1011-1013 of the respective functions, this transmission packet is transferred (forwarded) to the LAN control unit 115 through the transfer task 1014, thus transmitting the packet. As a matter of course, this packet transmission (and receipt) processing is executed based on the IP protocol, i.e., IPv6.

Figure 5:
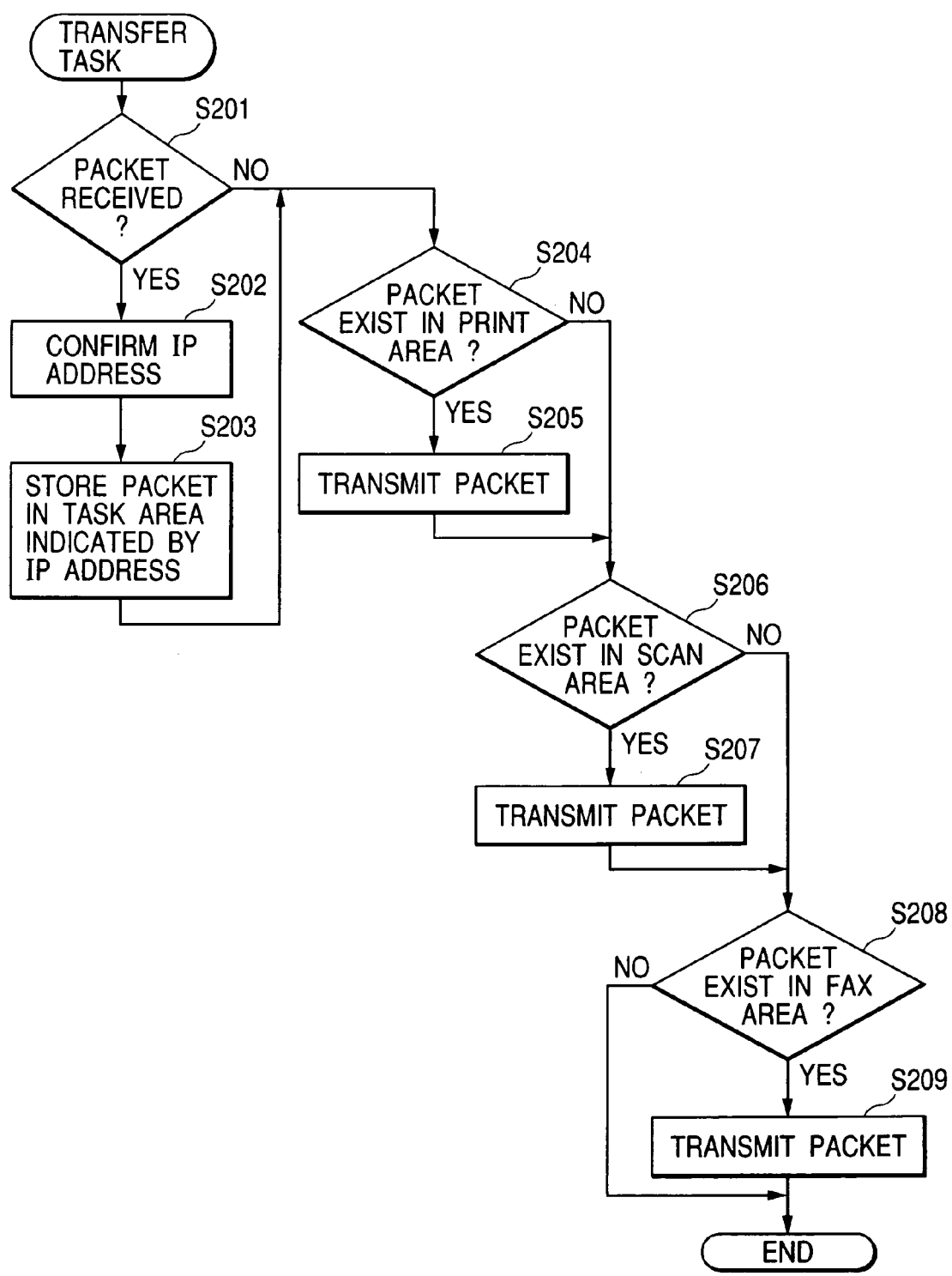
FIG. 5 is a flowchart showing a transfer task in the apparatus in FIG. 1.

FIG. 5 shows a specific control procedure of the transfer task 1014.

Upon booting the transfer task 1014, at first, it is checked in step S201 whether the data packet is received or not. If the packet has been received, the processing proceeds to step S202, wherein the packet received from the LAN control unit 115 is read, and a destination IP address thereof is confirmed.

Next, in step S203, this packet is stored in the buffer area of the control task designated by the IP address in the buffer memory 104.

Subsequently, it is checked in step S204 whether or not there is the transmission packet in the print area 104a on the buffer memory. If the transmission packet exists therein, in step S205, this packet is forwarded to the LAN control unit 115 and transmitted onto the LAN.

Moreover, it is checked in step S206 whether or not there is the transmission packet in the scan area 104b on the buffer memory. If the transmission packet exists therein, in step S207, this packet is forwarded to the LAN control unit 115 and transmitted onto the LAN. Subsequently, it is checked in step S208 whether or not there is the transmission packet in the PC-FAX area 104c on the buffer memory. If the transmission packet exists therein, in step S209, this packet is forwarded to the LAN control unit 115 and transmitted onto the LAN.

The print operation will herein be explained. The PC (or other terminal on the LAN) converts an image to be recorded into image data optimal to the printer of the terminal apparatus by use of printer driver software installed into the PC, then transmits a data packet of the image data together with commands necessary for the printer to the IP address of the printer of the terminal apparatus via LAN. The LAN control unit 115 receives the data packet transmitted, and notifies the control unit 101 of this receipt. The control unit 101 boots the transfer task 1014, confirms a destination address of the data packet received by the LAN control unit 115, and, its destination being the printer, stores this data packet in the print area 104a on the buffer memory. The transfer task 1014 sequentially stores the data packets in the print area 104a on the buffer memory each time the data packet addressed to the printer is received. When receiving the data packet having arrived at the IP address of the printer, the control unit 101 boots a print control task 1011.

The print control task 1011 sequentially reads the data stored in the print area 104a on the buffer memory, analyzes a print command therefrom, and records the image data sent in sequence according to the command, by use of the recorder unit.

Figure 6:
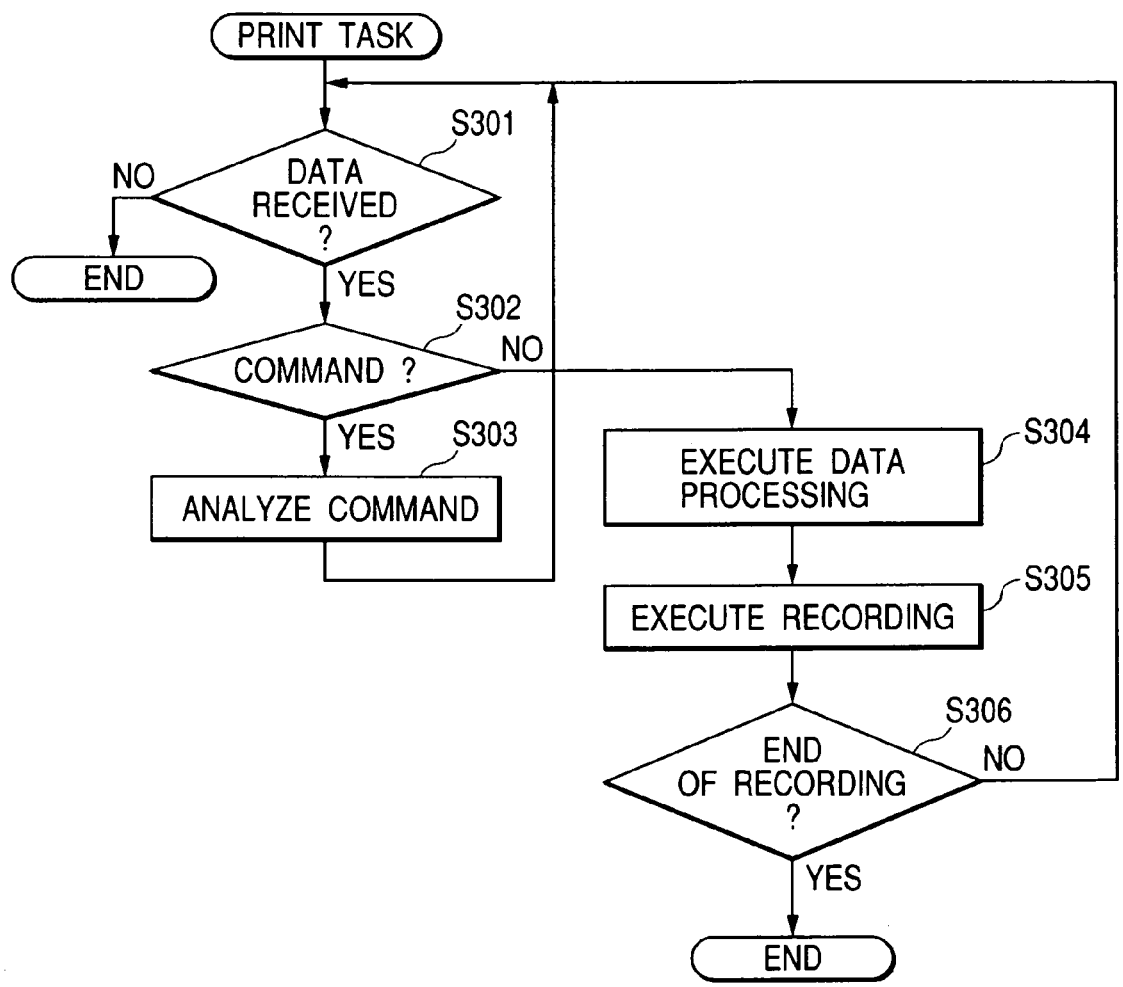
FIG. 6 is a flowchart showing a print task in the apparatus in FIG. 1.

FIG. 6 shows a control procedure of the print control task 1011.

Upon booting the print task, to begin with, it is checked in step S301 whether or not the data packet is received in the print area 104a on the buffer memory. If the packet is received, the processing proceeds to step S302, wherein it is checked whether the received packet is image data or command data for recording. If it is the command data, the command is analyzed in step S303, and a recording environment requested by the PC is settled. If the packet is the image data in step S302, the processing advances to step S304, wherein data processing for matching the image data with the recorder unit 109 is executed based on the command data. In step S305, the thus processed image data is transferred to the recorder unit 109, wherein the image is recorded. An end of the record processing is judged by detecting an end command or an end of the record data in step S306.

Next, in the scan operation, scanner driver software installed into the PC packetizes commands for designating a read operation of a reading resolution, a reading mode, a reading size, etc. and a reading start command, and transmits this packet to the IP address of the scanner of the terminal apparatus via LAN. As in the case of the printer operation, the LAN control unit 115 receives the data packet transmitted, and notifies the control unit 101 of this receipt. The control unit 101 boots the transfer task 1014, confirms a destination address of the data packet received by the LAN control unit 115, and, its destination being the scanner, stores this data packet in the scanner area 104b on the buffer memory. The transfer task 1014 sequentially stores the data packets in the scanner area 104b on the buffer memory each time the data packet addressed to the scanner is received. When receiving the data packet having arrived at the IP address of the scanner, the control unit 101 boots a scan control task 1012.

The scan control task 1012 analyzes the command data stored in the scan area 104b on the buffer memory, and reads an original placed on an original board of the terminal apparatus by a reading method designated by this command. Then, the scan control task 1012 adds the destination address of the PC to the read data subjected to the image processing in the read processing unit for packetization, and sequentially stores thus obtained packets in the scanner area 104b on the buffer memory. If the transmission packet of the scan data is written to the scanner area 104b on the buffer memory just when the transfer task 1014 is booted, the transfer task 1014 transmits the same data to the PC from the LAN control unit 115.

Figure 7:
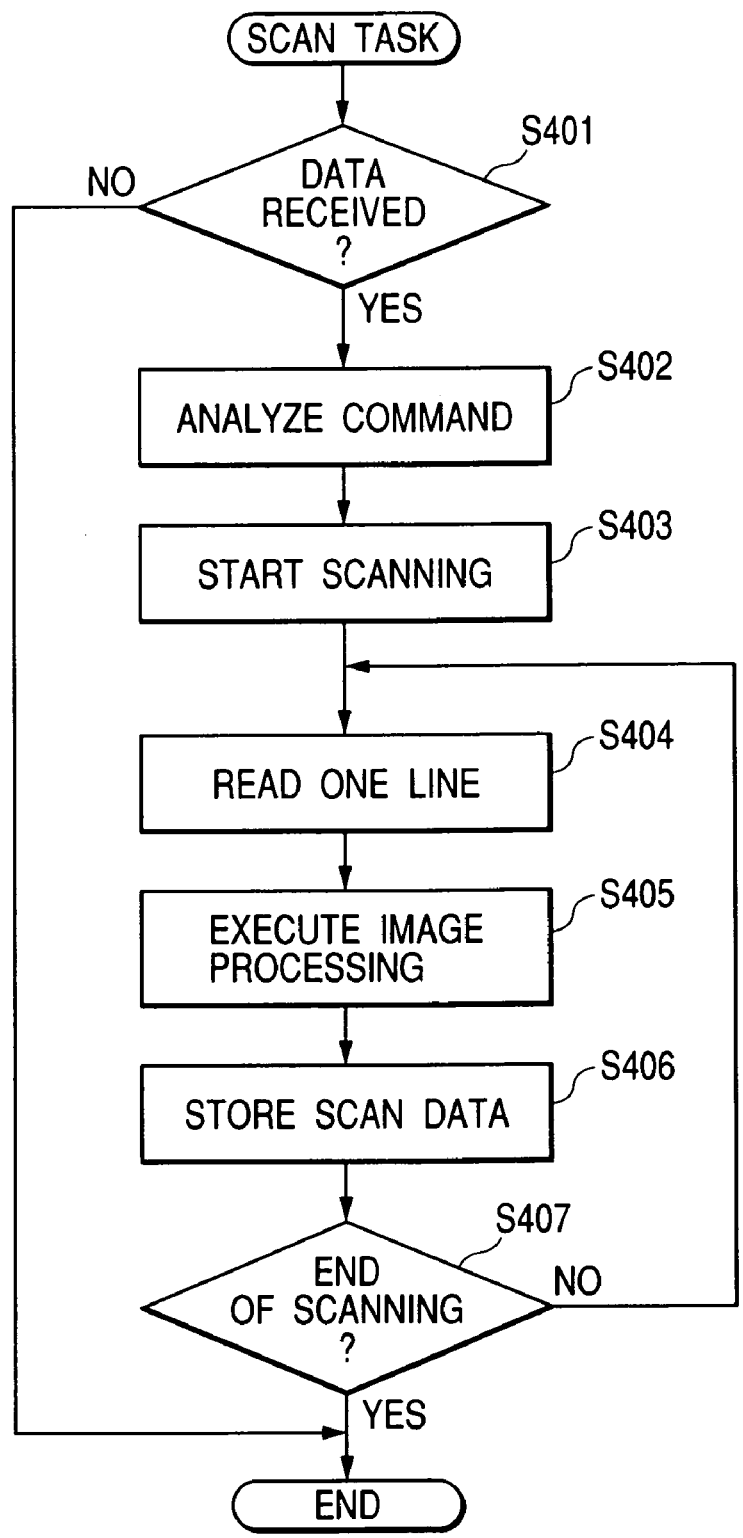
FIG. 7 is a flowchart showing a scan task in the apparatus in FIG. 1.

FIG. 7 shows a control procedure of the scan task 1012. Upon booting the scan task 1012, it is checked in step S401 whether or not the data packet is received in the scan area 104b on the buffer memory. If the packet is received, the processing proceeds to step S402, wherein a command of the received packet is analyzed.

In step S403, the reader unit 107 starts a scan operation in accordance with the scan command analyzed in step S402. When an image for one line is read in step S404, the image processing unit 106 effects image processing in step S405, whereby the image data is converted into digital data. In step S406, a packet addressed to a designated IP address is produced and stored in the scan area 104b on the buffer memory. The operation from step S404 down to S406 is repeated a certain number of times corresponding to the number of lines designated by the command. The packet stored on the scan area 104b on the buffer memory is transmitted onto the LAN through the transfer task 1014 described above. An end of the scan is judged in step S407 by detecting such events (conditions) as an exhaustion of the sheets, and so on.

In the case of sending the image data by FAX in the PC-FAX operation, PC-FAX driver software installed into the PC packetizes commands for designating a FAX communication operation indicating a telephone number of a transmission destination party, an image resolution, an image size, a communication speed, etc. and a transmission image data, and transmits this packet to an IP address of the PC-FAX of the terminal apparatus via LAN. The LAN control unit 115 receives the data packet transmitted, and notifies the control unit 101 of this receipt. The control unit 101 boots the transfer task 1014, confirms a destination address of the data packet received by the LAN control unit 115, and, its destination being the PC-FAX, stores this data packet in the PC-FAX area 104c on the buffer memory. The transfer task 1014 sequentially stores the data packets in the PC-FAX area 104c on the buffer memory each time the data packet addressed to the PC-FAX is received. When the data packet having arrived at the IP address of the PC-FAX is received, the control unit 101 boots a PC-FAX control task 1013.

The PC-FAX control task 1013 analyzes the command data stored in the PC-FAX area 104c on the buffer memory, originates a call to a telephone number of a FAX transmission destination designated by the command by controlling NCU of the communication control unit 110, then runs a communication protocol pursuant to T.30 Recommendations of CCITT (Consultative Committee for International Telegraph and Telephone), encodes the image data (in the CODEC processing unit 111) sent from the PC by a coding system that the FAX of the transmission destination party supports, and transmits the encoded image data with modulating the image data by the MODEM of the communication processing unit 110. In this case, if the FAX of the transmission destination party does not support the resolution and the communication speed designated by the PC, fall-back processing is properly executed.

Figure 8:
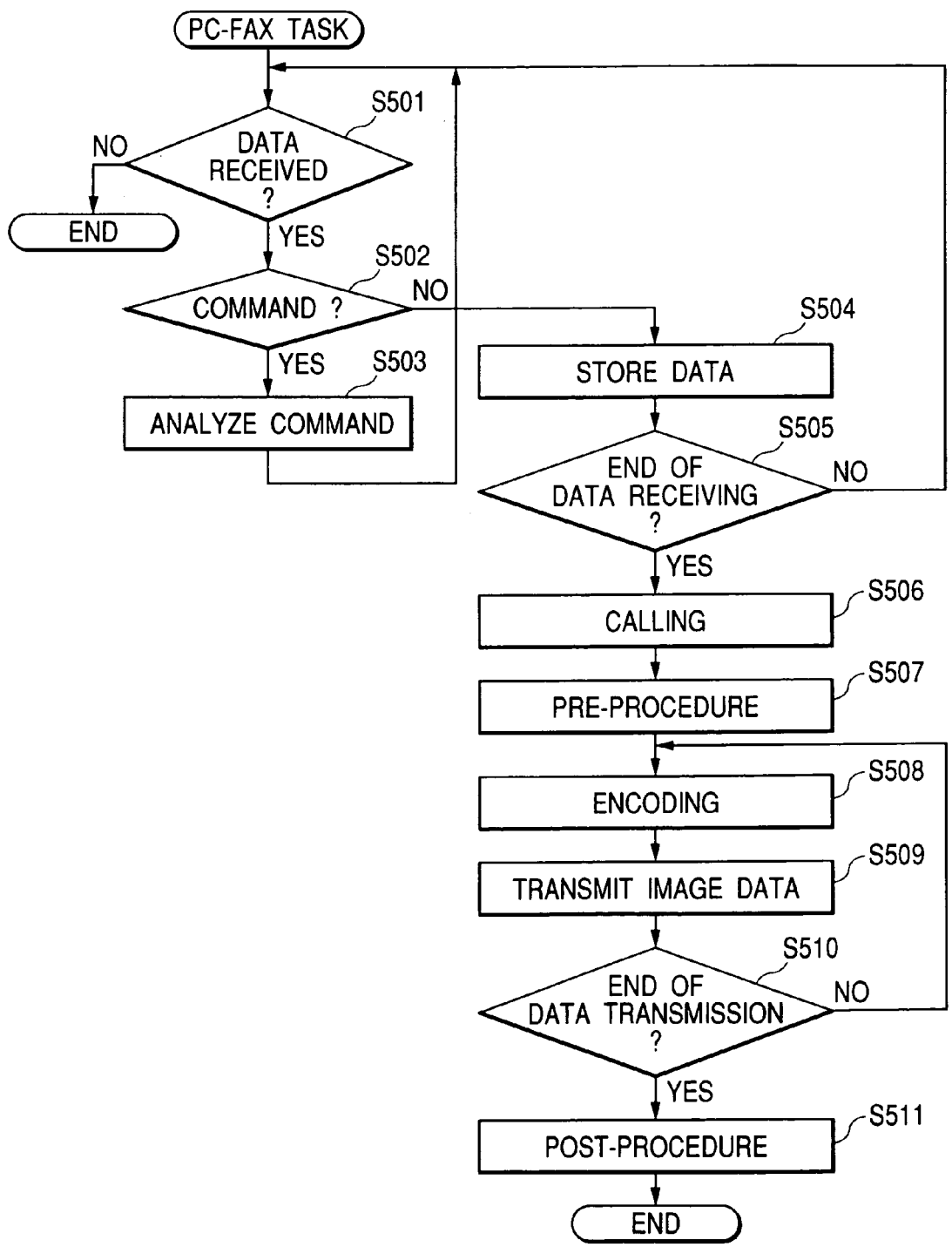
FIG. 8 is a flowchart showing a facsimile communication task in the apparatus in FIG. 1.

FIG. 8 shows a control procedure of the PC-FAX task 1013. Upon booting the PC-FAX task 1013, it is checked in step S501 whether or not the data packet is received in the PC-FAX area 104c on the buffer memory. If the packet is received therein, the processing proceeds to step S502, wherein it is checked whether the received packet is image data or command data for the FAX transmission.

In the case of detecting the command data for the FAX transmission, in step S503, a command thereof is analyzed, and a transmission condition, a telephone number of the transmission destination party, etc. are confirmed. Further, if the packet is the image data in step S502, the processing advances to step S504, wherein the image data is stored in the image area 104d on the buffer memory.

In step S505, when all the image data that should be transmitted have been received, the telephone number designated by the PC is dialed in step S506. When the FAX of the destination party answers, a facsimile pre-procedure pursuant to T-30 Recommendations of CCITT is carried out in step S507. In step S508, the image data stored on the buffer memory is encoded by the CODEX processing unit 111 so as to match the FAX of the transmission destination party, and the image data is modulated and transmitted to the telephone line through the communication processing unit 110 in step S509.

It is confirmed in step S510 that all pieces of image data have been transmitted, a facsimile post-procedure is carried out in step S511, and the communications are terminated. The operation started with originating the call in step S506 and ended with the facsimile post-procedure in step S511, is the FAX transmission procedure pursuant to T.30 Recommendations of CCITT. The facsimile transmission procedure pursuant to T.30 Recommendations of CCITT is known, and hence a further detailed description thereof is omitted in this embodiment.

As described above, the respective control tasks 1011 to 1013 for controlling the print, the scan and the FAX transmission/receipt are under the management by the OS and subjected to the time division process by the optimum task switchover. The transmission and the receipt of packet data to and from the PC are performed physically among the respective control task areas (FIG. 3) on the buffer memory in the terminal apparatus. Even when a plurality of operations are simultaneously requested by the PC, it is possible to simultaneously execute the processing thereof. Namely, the control tasks 1011 to 1013 for controlling the print, the scan and the FAX transmission/receipt are subjected to the time division processing and thus executed as if the single-function apparatuses separately operate.

Given is an explanation of, for example, a case where the print operation and the scan operation are simultaneously requested. At first, when the print data is sent from the PC, the transfer task 1014 is booted and it sequentially accumulates the print data received from the LAN control unit in the print area 104a on the buffer memory. Subsequently, when the print task 1011 is booted upon a task switchover of the OS, this print task 1011 reads the print data accumulated on the buffer memory and records these pieces of print data. Next, when the scan task 1012 is booted upon a task switchover, this scan task 1012 accumulates the generated scan data in the scan area 104b on the buffer memory. Subsequently, if the scan data have already been lined up (or prepared) in the scan area 104b on the buffer memory when booting the transfer task 1014, the transfer task 1014 transfers the scan data to the LAN control unit 115 and then transmits the same data to the PC.

Thus, the scheme is that the print data sent from the PC is accumulated on the buffer memory, and, during only a running period of the print task 1011, the record of the print data accumulated on the buffer memory is performed, and therefore the print data can be received even when the print task 1011 does not run. Moreover, in the scan operation, the generation of the scan data and the transfer of the scan data to the PC, are executed by the different tasks. If the scan data exists in the scan area 104b on the buffer memory when the transfer task 1014 is booted, the scan data is transmitted to the PC. Therefore the scan is merely task required to generate the scan data for only a time allocated by the OS, whereby the print operation and the scan operation can be simultaneously executed.

The discussion has been made based on the combination of the print processing and the scan process, however, the time division multiplex processing described above can be likewise performed also by arbitrarily combining the respective functions configuring the terminal apparatus in FIG. 1. The plurality of operations can be simultaneously performed even when simultaneously requested.

As discussed above, only one control unit and one LAN connecting means are employed, there are acquired the plurality of IP addresses each unique to each of the plurality of functions (which are the print function, the scan function and the facsimile communication function in the example given above), whereby the terminal apparatus can be operated in a way that operates these functions through the above IP addresses as if the different appliances which can function at the same time behave independently on the LAN.

Namely, according to this embodiment, owing to the simple and inexpensive structure using only the single LAN connecting means, there are acquired the plurality of IP addresses each unique to each of the functions of the multi-function image processing apparatus, and the respective functions of the image processing apparatus can independently operate through these IP addresses, thereby making it possible to improve an operability of the image processing apparatus.

Further, the respective functions of the image processing apparatus input and output the data by use of the IP addresses corresponding thereto, and individually operate in accordance with the task programs that run on the time-division basis with the task switchover. Further, the data can be inputted and outputted by utilizing the buffer memory areas for the respective tasks, and hence the system software for executing the individual functions of the image processing apparatus can be designed and developed more easily than ever before as a suite of task program modules exhibiting high independence. A piece of software (for only a printer if the appliance is the printer, or for only a scanner if the appliance is the scanner) of the single-function appliance operated on the network can be diverted to the task program modules for executing the respective functions of the image processing apparatus simply by re-designing the above software as the case may be.

Moreover, as viewed from the PC utilizing the present image processing apparatus, the individual functions of the present image processing apparatus appear to be the different appliances each having the independent (unique) IP address on the network. Then, from the PC side, there is installed such driver program that supports the function required by the user as in the case of the driver program for the printer if the printer function is needed or the driver program for the scanner if the scanner function is needed, and the user can thus access each of the functions of the image processing apparatus through the driver program and has therefore no necessity of installing a large capacity of complicated driver programs into the PC as it is requested of the conventional multi-function image processing apparatus. This enables a large amount of resources of the memory and the disk of the PC to be saved.

Note that the above discussion has been made on the assumption that the network to which the image processing apparatus is connected via the router (designated by 303 in FIG. 1) is "LAN", and can be all, as a matter of course, accepted as it is even when the network explained in relation to the router is "WAN" (Wide Area Network) such as the Internet.

Further, the above discussion did not go into a detailed description of communication protocols (TCP/IP and UDP/IP (User Datagram Protocol/Internet Protocol), or a much higher-order socket service, etc.) on higher-order layers than the IP protocol, however, it is, needless to say, possible to utilize a resource sharing service (for example, a printer/file sharing service) on a arbitrary system and a protocol therefor.

Note that the control procedures shown in the flowcharts in FIGS. 4 through 8 are normally stored on the ROM 102 are executed directly or after being developed on the RAM 103, however, the storage medium on which the programs for actualizing the present invention should be stored is not limited to the ROM 102 described above and may be an arbitrary storage medium such as a flexible disk, an MO, a CD-ROM, etc. Moreover, a supply route of the programs for actualizing the present invention is not limited to those storage mediums and may take a scheme such as being downloaded/installed via the network.

Further, the apparatus in FIG. 1 has been exemplified as the multi-function image processing apparatus that synthesizes the three functions such as the print function, the scan function and the facsimile communication function, however, the categories and the number of the plurality of functions to which the independent (unique) IP addresses should be assigned are each not, as a matter of course, limited to three given above.

As obvious from the description made above, according to the present invention, the image processing apparatus having the plurality of image processing functions, the control method thereof and the control program thereof adopt the architecture that the apparatus is connected to the IPv6 router on the network, the prefix information is acquired from the IPv6 router, the IP address unique to each of the plurality of image processing functions is generated based on the acquired prefix information, the apparatus communicates with other appliance on the network by use of the IP address generated for every image processing function, and each of the plurality of image processing functions is made to operate in accordance with a result of the communication. Hence, there are obtained excellent effects such as improving the operability of the multi-function image processing apparatus with the simple inexpensive architecture by utilizing the IPv6 technology and enabling the required system software to be easily designed.

The invention claimed is:

1. A multi-function image processing apparatus that includes a plurality of image processing units that perform a plurality of image processing functions, including a printer unit that performs a printer function and a scanner unit that performs a scanner function, the apparatus comprising:
    an IP address generator connected to an Internet Protocol Version 6 (IPv6) router on a network that repeatedly acquires a prefix information from the IPv6 router and generates a plurality of IP addresses, based on the acquired prefix information, wherein each of the IP addresses is unique to a different one of the plurality of image processing units, and wherein a number of the IP addresses is equal to the number of the image processing units; and
    a controller that communicates with at least one appliance on the network using the IP addresses generated for the image processing units and operates each of the image processing units to perform communications between each of the image processing units and the at least one appliance, and that executes a transfer task for transferring packet data,
    wherein the transfer task for transferring packet data is managed by an Operating System (OS) using buffer areas allocated to the printer unit and the scanner unit, respectively.

2. The multi-function image processing apparatus according to claim 1, wherein the controller performs the plurality of image processing functions by executing, on a time-division basis using a task switchover, a plurality of control task programs corresponding respectively to the plurality of image processing functions, and performs the communications using the IP addresses generated for the plurality of image processing units based on the control task program, taking as a unit a control task program corresponding to an image processing function of the plurality of image processing functions.

3. A control method performed by a multi-function image processing apparatus that includes a plurality of image processing units that perform a plurality of image processing functions, including a printer unit that performs a printer function and a scanner unit that performs a scanner function, the method comprising:
    an IP address generating step of establishing a connection to an Internet Protocol version 6 (IPv6) router on a network, repeatedly acquiring prefix information from the IPv6 router, and generating a plurality of IP addresses, based on the acquired prefix information, wherein each of the IP addresses is unique to a different one of the plurality of image processing units, and wherein a number of IP address is equal to a number of image processing units;
    a controlling step of performing a communication with at least one appliance on the network using the IP addresses generated from the image processing units and operating each of the image processing units, so that the controlling step executes communications between each of the image processing unit and the at least one appliance, and an executing step of executing a transfer task for transferring packet data managed by the Operating System (OS) using buffer areas allocated to the printer unit and the scanner unit, respectively.

4. The control method according to claim 3, wherein the controlling step involves executing the plurality of image processing functions by executing, on a time-division basis using a task switchover, control task programs corresponding respectively to the plurality of image processing functions, and performing the communications using the IP addresses generated for the plurality of image processing functions based on the control task program, taking as a unit a control task program corresponding to one of the plurality of image processing functions.

5. A non-transitory computer-readable medium storing a computer-executable control program for performing a method of controlling a multi-function image processing apparatus that includes a plurality of image processing units that perform a plurality of image processing functions, including a printer unit that performs a printer function and a scanner unit that performs a scanner function, the method comprising:
an IP address generating step of establishing a connection to an Internet Protocol version 6 (IPv6) router on a network, repeatedly acquiring prefix information from the IPv6 router, and generating a plurality of IP addresses, based on the acquired prefix information, wherein each of the IP addresses is unique to a different one of the plurality of image processing functions, and wherein a number of the plurality of IP addresses is equal to a number of the plurality of image processing units;
a controlling step of performing a communication with at least one appliance on the network using the IP addresses generated for the image processing units and operating each of the image processing units, so that communication between tech of the image processing units and the at least one appliance are performed in the controlling step, and
an executing step of executing a transfer task for transferring packed data managed by an Operating System (OS) using buffer areas allocated to the printer unit and the scanner unit, respectively.

6. The non-transitory computer-readable medium according to claim 5, wherein the plurality of image processing functions are performed in the controlling step by executing, on a time-division basis using a task switchover, a plurality of control task programs corresponding respectively to the plurality of image processing functions, and performing the communications using the IP addresses generated for the plurality of image processing functions based on the control task program, taking as a unit a control task program corresponding to one of the plurality of image processing functions.

7. The multi-function image processing apparatus according to claim 1, wherein the IP address generator sends each generated IP address to the router to check for duplication of the IP address, and, if the IP address is a duplicate, the IP address generator generates an IP address different from the duplicate IP address based on the prefix information.

8. The method according to claim 3, wherein IP address generating step includes sending each the generated IP address to the router to check for duplication of the IP address, and, if the IP address is a duplicate, the IP address generating step includes generating an IP address different from the duplicate IP address based on the prefix information.

* * * * *